(12) United States Patent
Cremona et al.

(10) Patent No.: US 12,057,894 B2
(45) Date of Patent: Aug. 6, 2024

(54) HIGH SPEED POWER LINE COMMUNICATIONS FOR AUTOMOTIVE TRACTORS AND TRAILERS

(71) Applicant: Bendix Commercial Vehicle Systems LLC, Avon, OH (US)

(72) Inventors: Michael D. Cremona, Lakewood, OH (US); Thomas J. Hayes, Lakewood, OH (US); Tandi Wijaya, Highland Heights, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 31 days.

(21) Appl. No.: 17/884,025

(22) Filed: Aug. 9, 2022

(65) Prior Publication Data
US 2024/0056122 A1 Feb. 15, 2024

(51) Int. Cl.
*H04B 3/54* (2006.01)
*H04L 12/40* (2006.01)

(52) U.S. Cl.
CPC ............. *H04B 3/548* (2013.01); *H04L 12/40* (2013.01); *H04L 2012/40215* (2013.01)

(58) Field of Classification Search
CPC ...................................... H04B 3/548
USPC ........................................................ 375/262
See application file for complete search history.

(56) References Cited

U.S. PATENT DOCUMENTS

| | | | |
|---|---|---|---|
| 8,680,976 B2 | 3/2014 | Lesesky | |
| 10,050,674 B1 | 8/2018 | Hayes et al. | |
| 2011/0286339 A1* | 11/2011 | Masuda | H04B 3/542 370/248 |
| 2016/0359741 A1* | 12/2016 | Cooper | H04W 4/44 |
| 2023/0134863 A1* | 5/2023 | Kautge | H04B 1/006 455/552.1 |

* cited by examiner

*Primary Examiner* — Lihong Yu
(74) *Attorney, Agent, or Firm* — Reising Ethington P.C.

(57) ABSTRACT

A system for transmitting and receiving signals having varying frequencies along a power line within a vehicle is provided. A transceiver is configured to transmit output signals to and receive input signals from various electronic systems on a vehicle along a power line at a first frequency. A frequency control circuit determines whether the destination system for the output signal is configured to receive the output signal at the first frequency or a different frequency and modulates the frequency of the output signal if necessary. The frequency control circuit also determines, prior to receipt by the transceiver, whether the input signal has the first frequency or different frequency and modulates the frequency of the input signal if necessary.

18 Claims, 5 Drawing Sheets

HIGH SPEED POWER LINE COMMUNICATIONS FOR AUTOMOTIVE TRACTORS AND TRAILERS

BACKGROUND OF THE INVENTION a. Field of the Invention

This invention relates to communications systems used in vehicles such as tractor-trailers. In particular, the invention relates to a system and method for transmitting and receiving signals having varying frequencies along a power line within a vehicle.

b. Background Art

Power line communication (PLC) is a communication method in which data is transmitted over wires that are also used to deliver electric power. The data is encoded within a signal that is transmitted over the wires in frequency ranges outside of those used to transmit electric power. PLC is advantageous relative to other communication methods because it enables communication using existing wiring. Tractor-trailers frequently employ (PLC) to exchange messages between members of the tractor-trailer including, for example, sensor readings from vehicle systems including anti-lock braking systems, collision avoidance systems, tire pressure monitoring systems and other vehicle systems as well as commands used to control anti-lock braking systems, lighting systems and other vehicle systems.

Tractor-trailers that implement PLC typically employ transceivers to interface between the vehicle power line and microprocessors and other electronic control systems used in the vehicle. The transceiver commonly used in the industry is a proprietary integrated circuit offered for sale by Qualcomm Atheros, Inc. under the name "SSC P485 PL Transceiver IC" that is intended to implement a communications protocol developed by the Society of Automotive Engineers (SAE) set forth in a document number J2497 and titled "Power Line Carrier Communications for Commercial Vehicles." Communications under this protocol are transmitted at relatively low speeds at frequencies between 100-400 KHz and a baud rate of 9600 baud. These speeds are sufficient for certain types of communications including, for example, the status of an anti-lock braking system or the status of brake pad wear. Other communications, however, require higher transmission speeds for use in current and developing applications in order to improve the safety and/or effectiveness of the application or simply because the communications require transfer of larger amounts of data. To handle higher speed communications, different transceivers are required that implement different communication protocols other than the J2497 protocol. These transceivers, however, are not configured to handle the lower speed communications from pre-existing systems on the tractor trailer that are typically transmitted and received using the SSC P485 PL Transceiver. As a result, certain systems on the tractor-trailer that communicate with both systems communicating under the J2497 protocol and systems communicating using higher speed communication protocols require a multitude of transceivers and related hardware to handle communications transmitted to, and received from, each system.

The inventors herein have recognized a need for a system and method for transmitting and receiving signals having varying frequencies along a power line within a vehicle that will minimize and/or eliminate one or more of the above-identified deficiencies.

BRIEF SUMMARY OF THE INVENTION

This invention relates to communications systems used in vehicles such as tractor-trailers. In particular, the invention relates to a system and method for transmitting and receiving signals having varying frequencies along a power line within a vehicle.

One embodiment of a system for transmitting and receiving signals having varying frequencies along a power line within a vehicle includes a transceiver configured to receive a signal generated by a controller for a first electronic system on the vehicle and transmit an output signal along the power line to a second electronic system on the vehicle responsive to the signal received from the controller. The transceiver is configured to transmit the output signal at a first frequency. The system further includes a frequency control circuit. The frequency control circuit is configured to determine whether the second electronic system is configured to receive the output signal at the first frequency or at a second frequency different than the first frequency and to modulate the frequency of the output signal to the second frequency if the second electronic system is configured to receive the output signal at the second frequency. In another embodiment, the transceiver is further configured to receive an input signal along the power line generated by one of the second electronic system and a third electronic system on the vehicle and transmit a signal to the controller responsive to the input signal received from the one of the second electronic system and the third electronic system. The transceiver is configured to receive the input signal at the first frequency and the frequency control circuit is further configured to determine whether the input signal has the first frequency or a third frequency different than the first frequency and to modulate the frequency of the input signal to the first frequency if the input signal has the third frequency.

One embodiment of a method for transmitting and receiving signals having varying frequencies along a power line within a vehicle includes receiving an output signal transmitted by a transceiver coupled to a controller for a first electronic system on the vehicle, the transceiver configured to transmit the output signal along the power line at a first frequency to a second electronic system on the vehicle responsive to the signal generated by the controller. The method further includes determining whether the second electronic system is configured to receive the output signal at the first frequency or at a second frequency different than the first frequency and modulating the frequency of the output signal to the second frequency if the second electronic system is configured to receive the output signal at the second frequency. In another embodiment, the method further includes receiving an input signal transmitted by one of the second electronic system and a third electronic system prior to receipt of the input signal by the transceiver, the transceiver configured to receive the input signal along the power line at the first frequency and to transmit a signal to the controller responsive to the input signal. The method further includes determining whether the input signal has the first frequency or a third frequency different than the first frequency and modulating the frequency of the input signal to the first frequency if the input signal has the third frequency.

A system and method for transmitting and receiving signals having varying frequencies along a power line within a vehicle in accordance the present teachings represent an improvement as compared to conventional systems and methods. In particular, the system and method disclosed herein enable transmission and receipt of communications at multiple frequencies along the power line using a single transceiver. As a result, the system and method facilitate high speed communications for applications requiring higher speed communications while preserving backwards compatibility with legacy systems transmitting communications at lower speeds and without requiring separate transceivers for handling communications at different speeds.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
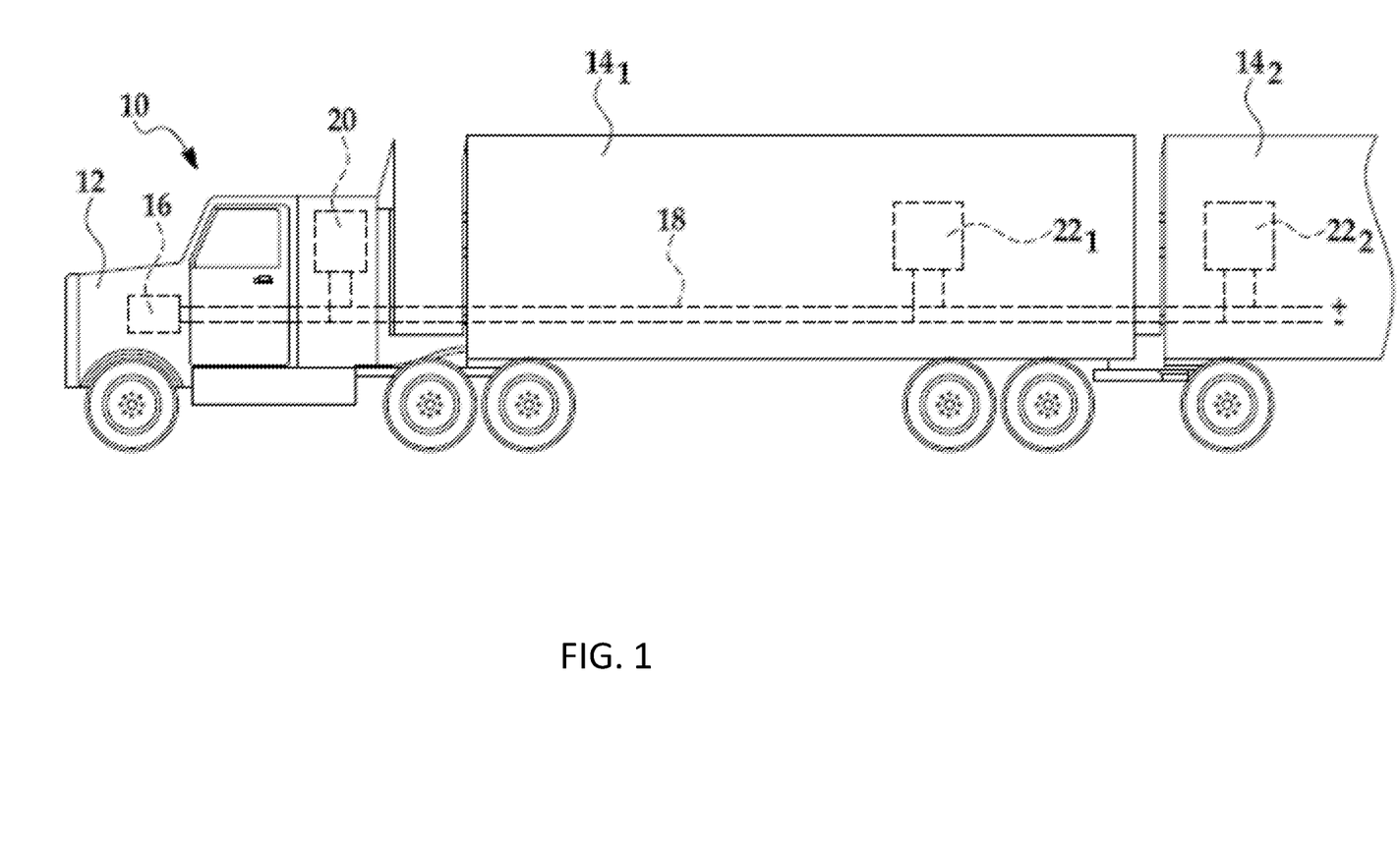
FIG. 1 is a diagrammatic view of a vehicle including a plurality of electronic systems communicating along a power line in the vehicle.

Referring now to the drawings wherein like reference numerals are used to identify identical components in the various views, FIG. 1 illustrates a tractor-trailer 10. Tractor-trailer 10 (also referred to as a semi) contains a truck or tractor 12 and one or more trailers $14_1 \ldots 14_N$. Tractor 12 contains a power unit, such as an internal combustion engine, and steering and drive axles. Tractor 12 also contains a battery 16 for use in starting the power unit and in providing power to various accessory systems. Trailers $14_1 \ldots 14_N$ are provided to store freight and are detachably coupled to tractor 12. Although a pair of trailers 14 are shown in the illustrated embodiment, it should be understood that the number of trailers 14 attached to tractor 12 may vary.

Tractor 12 and trailers 14 may include various fluid and power lines that extend between tractor 12 and trailers 14 including power line 18. The fluid and power lines allow delivery of fluids and electrical power from tractor 12 to trailers 14 for use in, for example, tire pressure management, braking, and activation of tail lights on trailer 14. Power line 18 also forms part of a network used to transmit communications between various electronic systems 20, $22_1 \ldots 22_N$ on tractor 12 and trailers 14, respectively. Systems 20, 22 may comprise any of a wide variety of systems commonly employed on tractor-trailer 10 including, for example, anti-lock braking systems, collision avoidance systems, tire pressure monitoring and control systems, trailer load monitoring systems, and lighting systems. Power line 18 may enable transmission of data from one or more systems 22 on trailers 14 to a system 20 on tractor 12 including, for example, sensor readings indicative of the operation of an anti-lock braking system, the location of surrounding vehicles and infrastructure, pressure within the tires on a trailer 14, or a shift in the load carried by a trailer 14. Power line 18 may also enable transmission of commands and data from tractor 12 to trailers 14 for use in controlling elements of an anti-lock braking system, tire pressure control system or lighting system on one or more of trailers 14.

Systems 20, 22 may be configured to transmit and receive communications at different frequencies depending on the nature of the communications. For example, system $22_1$ may be configured to transmit and receive communications at one frequency in accordance with the communication protocol under the J2497 standard referenced hereinabove. System $22_2$ may be configured to transmit and receive communications at a another, higher frequency (e.g., between 2 MHz and 50 MHz) in accordance with the communication protocols required by systems that require more frequent communications and/or require greater bandwidth for individual communications. Certain systems 20, 22 on tractor-trailer 10 may require communication with both of systems $22_1$ and $22_2$ and must therefore be configured for communications at multiple frequencies. For example, system 20 may be configured to control an operator interface within tractor 12 that conveys information to the operator of tractor-trailer 10 through visual, audio or haptic feedback mechanisms including information regarding the operational status of systems $22_1$, $22_2$ and safety warnings regarding, for example, loss of stability, insufficient braking, load shifting, and potential collisions generated as a result of communications from systems $22_1$, $22_2$.

Figure 2:
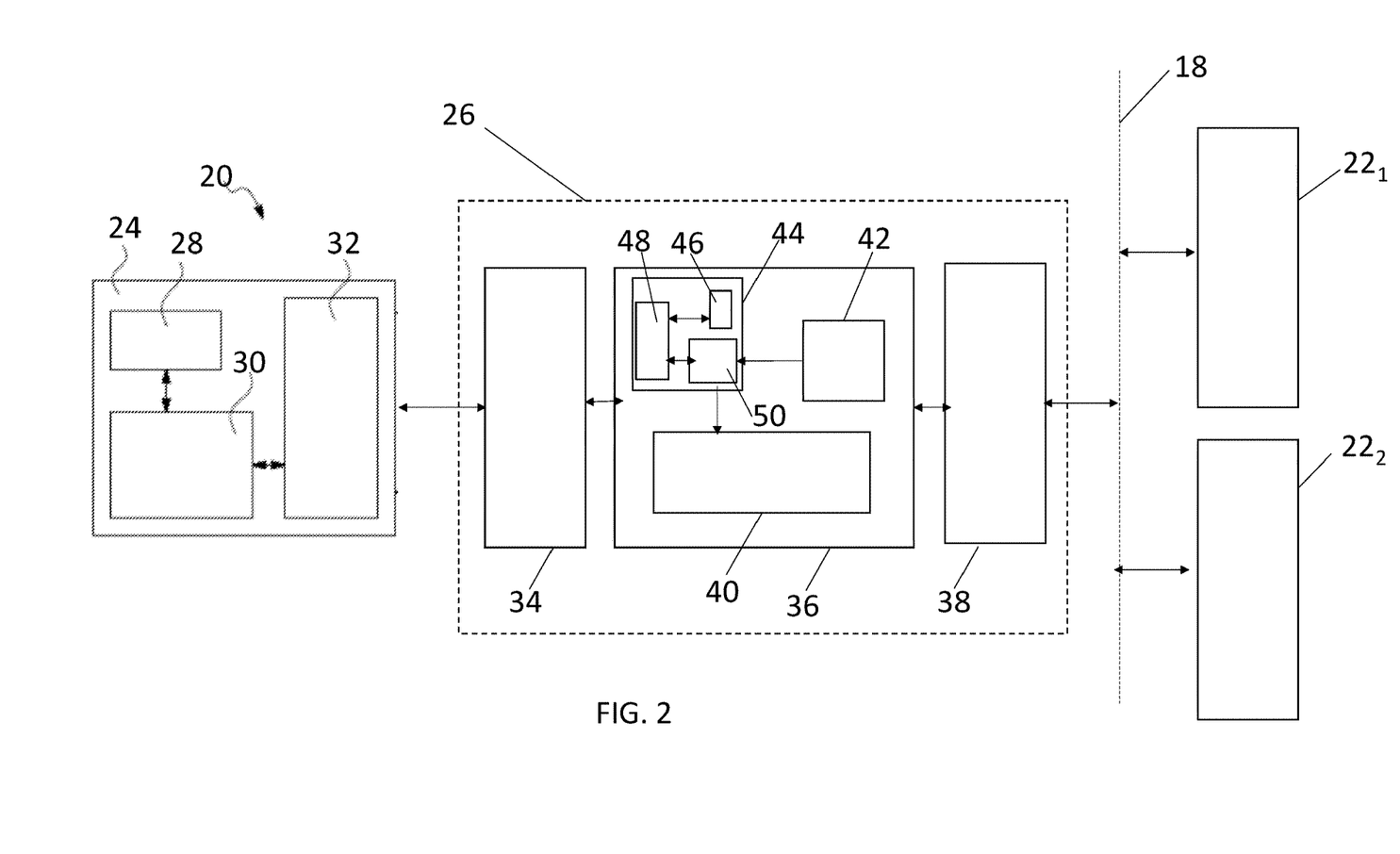
FIG. 2 is a diagrammatic view of one embodiment of a system for transmitting and receiving signals having varying frequencies along a power line in a vehicle.

Referring now to FIG. 2, one or more of systems 20, 22 may include a controller 24 and a system 26 for transmitting and receiving signals having varying frequencies along power line 18. In the illustrated embodiment, system 26 forms a part of system 20 in tractor 12 and enables communication with systems $22_1$, $22_2$ on trailers $14_1$, $14_2$ that are configured to transmit and receive communications at different frequencies. It should be understood, however, that system 26 could form a part of any system 20, 22 on tractor 12 or trailers 14 that communicates with other systems 20, 22 that transmit and receive communications at different frequencies along power line 18. It should also be understood that system 26 could form a part of a system 20, 22 on tractor 12 or trailers 14 that communicates along power line 18 only with systems 20, 22 on the same member of tractor-trailer 10 as opposed to between different members of tractor-trailer 10 as in the illustrated embodiment.

Controller 24 is provided to decode messages received from power line 18 and to encode messages for transmission on power line 18. Controller 24 may further be provided to perform a variety of actions in response to received messages depending on the purpose of the system 20, 22 in which controller 24 and system 26 are employed. Controller 24 may comprise a programmable microprocessor or microcontroller or may comprise an application specific integrated circuit (ASIC). Controller 24 may include a memory 28 and a central processing unit (CPU) 30. Controller 24 may also include an input/output (I/O) interface 32 including a plurality of input/output pins or terminals through which controller 24 may receive a plurality of input signals and transmit a plurality of output signals. The input signals may include signals received from system 26 while the output signals may include signals transmitted to system 26. In the illustrated embodiment, a single controller 24 is shown. It should be understood, however, that the functionality of controller 24 described herein may be divided among multiple sub-controllers.

System 26 is provided to enable transmission and reception of signals having varying frequencies along power line 18. System 26 may include a transceiver 34, a frequency control circuit 36 and signal conditioning circuit 38.

Transceiver 34 is provided to generate output signals for transmission along power line 18 responsive to signals received from controller 24. Transceiver 34 is also provided to receive input signals transmitted along power line 18 and to transmit signals to controller 24 responsive to the input signals. In accordance with one aspect of the teachings herein, transceiver 34 comprises a relatively high-speed transceiver configured to generate output signals and receive input signals at a relatively high frequency including, but not limited to, between 2 MHz and 50 MHz. In particular, transceiver 34 is configured to generate output signals and receive input signals at a frequency greater than the frequencies used in communications using the J2497 communication protocol identified hereinabove. Transceiver 34 may, for example, comprise the integrated circuit sold under product number CG5316 by the Lumissil Microsystems division of Integrated Silicon Solution Inc. of Milpitas, California, United States of America.

Frequency control circuit 36 is provided to modulate the frequency, if necessary, of output signals from transceiver 34 for transmission to systems $22_1$, $22_2$ and to modulate the frequency, if necessary, of signals from systems $22_1$, $22_2$ prior to delivery of input signals to transceiver 34. In accordance with one embodiment, circuit 36 may include a frequency selector circuit 40, a memory 42 and a controller 44. Elements of frequency control circuit 36 combine to function as a transmission frequency modulator configured to modulate, as needed, the frequency of output signals from transceiver 34 for transmission to systems $22_1$, $22_2$. Elements of circuit 36 also combine to form a reception frequency modulator configured to modulate, as needed, the frequency of input signals from systems $22_1$, $22_2$ prior to delivery of input signals to transceiver 34. In the illustrated embodiment at least frequency selector circuit 40 and controller 44 form a part of both the frequency transmission modulator and the frequency reception modulator. Memory 42 forms a part of at least the frequency transmission modulator as discussed in greater detail below. Although the transmission frequency modulator and reception frequency modulator are illustrated as a single frequency control circuit 36, it should be understood that the transmission frequency modulator and reception frequency modulator may form separate structures using separate frequency selector circuits 40, controllers 44 and related components.

Frequency selector circuit 40 modulates the frequency of output signals from transceiver 34 and/or the signals received from systems $22_1$, $22_2$, if necessary, responsive to commands from controller 44. Circuit 40 may comprise any of a number of conventional circuit structures used to modulate the frequency of a carrier wave including voltage-controlled oscillator (VCO) or resonant (LC) circuit whose capacitance is varied to cause changes in frequency.

Memory 42 may store data, data structures, software, firmware, programs, algorithms, scripts, and other electronic instructions. Memory 42 may comprise a semiconductor memory device and may comprise a combination of volatile (e.g., random-access memory (RAM), dynamic random-access memory (DRAM), or static random-access memory (SRAM)) and non-volatile memory (e.g., read only memory (ROM), programmable read only memory (PROM), erasable programmable read only memory (EPROM), electrically erasable programmable read only memory (EEPROM), flash memory) and may comprise a combination of permanent and rewritable memory. In accordance with one aspect of the present teachings, memory 42 may correlate systems 20, $22_1$, $22_2$ and/or the transceivers 34 (or transmitters or receivers) associated with systems 20, $22_1$, $22_2$ with one of a plurality of communication frequencies in a conventional data structure such as a look up table. The communication frequencies may comprise, for example a frequency corresponding to the J2497 standard discussed above and a higher frequency relative to the frequency corresponding to the J2497 standard. In accordance with another aspect of the present teachings, memory 42 may also store programming instructions (i.e., software or a computer program) to implement certain steps in a method for transmitting and receiving signals having varying frequencies along a power line within a vehicle as discussed in greater detail below. Although memory 42 is illustrated in FIG. 2 as being external to controller 44, it should be understood that memory 42 may be contained within controller 44.

Controller 44 is provided to control frequency selector circuit 40 in order to modulate, as needed, the frequency of output signals from transceiver 34 and/or the signals received from systems $22_1$, $22_2$. Controller 44 may comprise a programmable microprocessor or microcontroller or may comprise an application specific integrated circuit (ASIC). Controller 44 may include a memory 46 and a central processing unit (CPU) 48. Controller 44 may also include an input/output (I/O) interface 50 including a plurality of input/output pins or terminals through which controller 46 may receive a plurality of input signals and transmit a plurality of output signals. The input signals may include signals generated by systems 20, $22_1$, $22_2$ (and, in particular, transceivers 34 of system 20) while the output signals may include a control signal for frequency selector circuit 40. In the illustrated embodiment, a single controller 44 is shown. It should be understood, however, that the functionality of controller 44 described herein may be divided among multiple sub-controllers. In accordance with the present teachings, controller 44 may be configured with appropriate programming instructions (i.e., software or a computer program) to implement several steps in a method for transmitting and receiving signals having varying frequencies along a power line 18 within tractor-trailer 10 or another vehicle.

Signal conditioning circuit 38 is provided to condition signals received from power line 18 prior to input to frequency control circuit 36 and to condition signals output by frequency control circuit 36 for transmission on power line 18. Circuit 38 may include conventional circuit elements including, for example filters, amplifiers, analog/digital converters and similar components for conditioning signals received over power line 18 for delivery to circuit 36 and for conditioning signals output by circuit 36 for transmission over power line 18.

Figure 3:
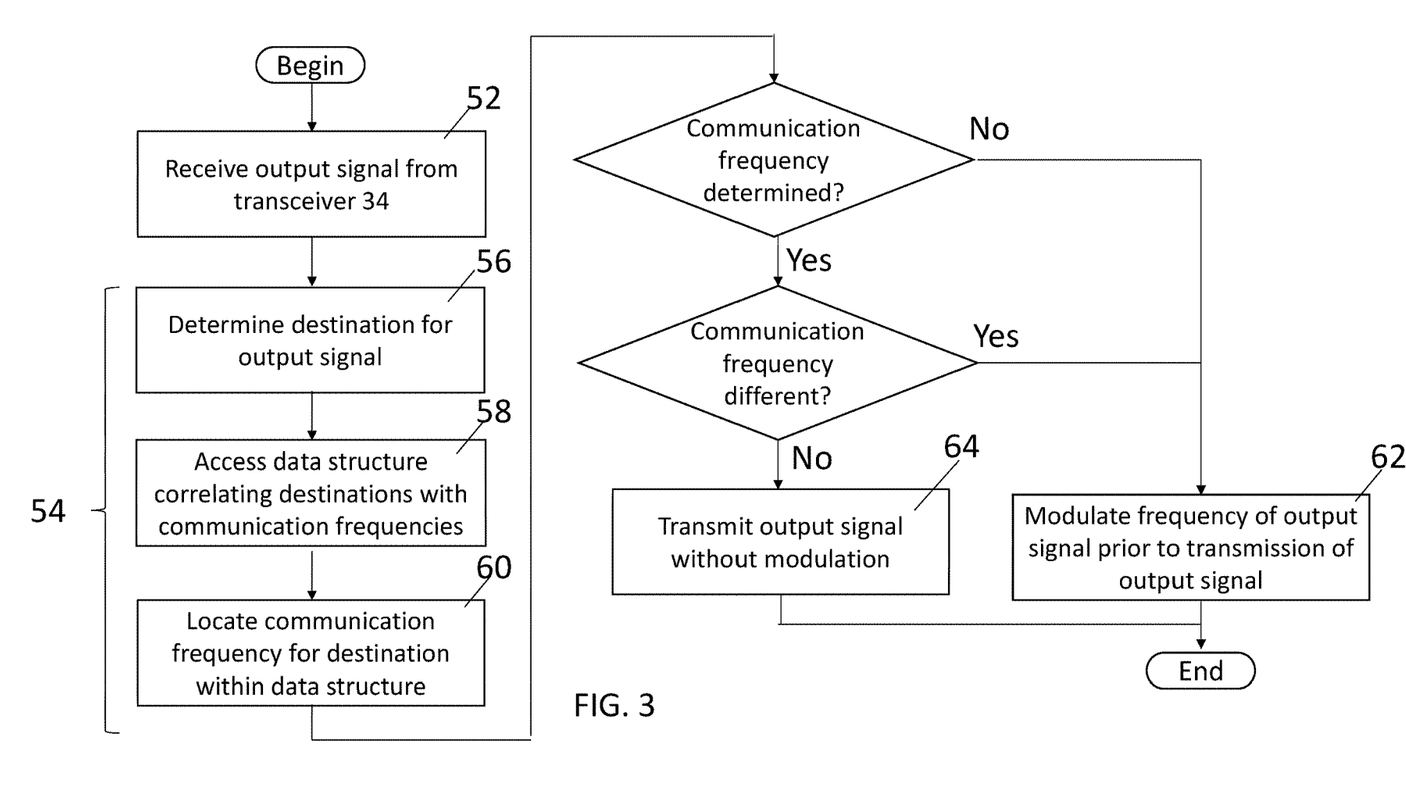
FIGS. 3-4 are flow chart diagrams illustrating steps in one embodiment of a method for transmitting and receiving signals having varying frequencies along a power line in a vehicle.
Figure 4:
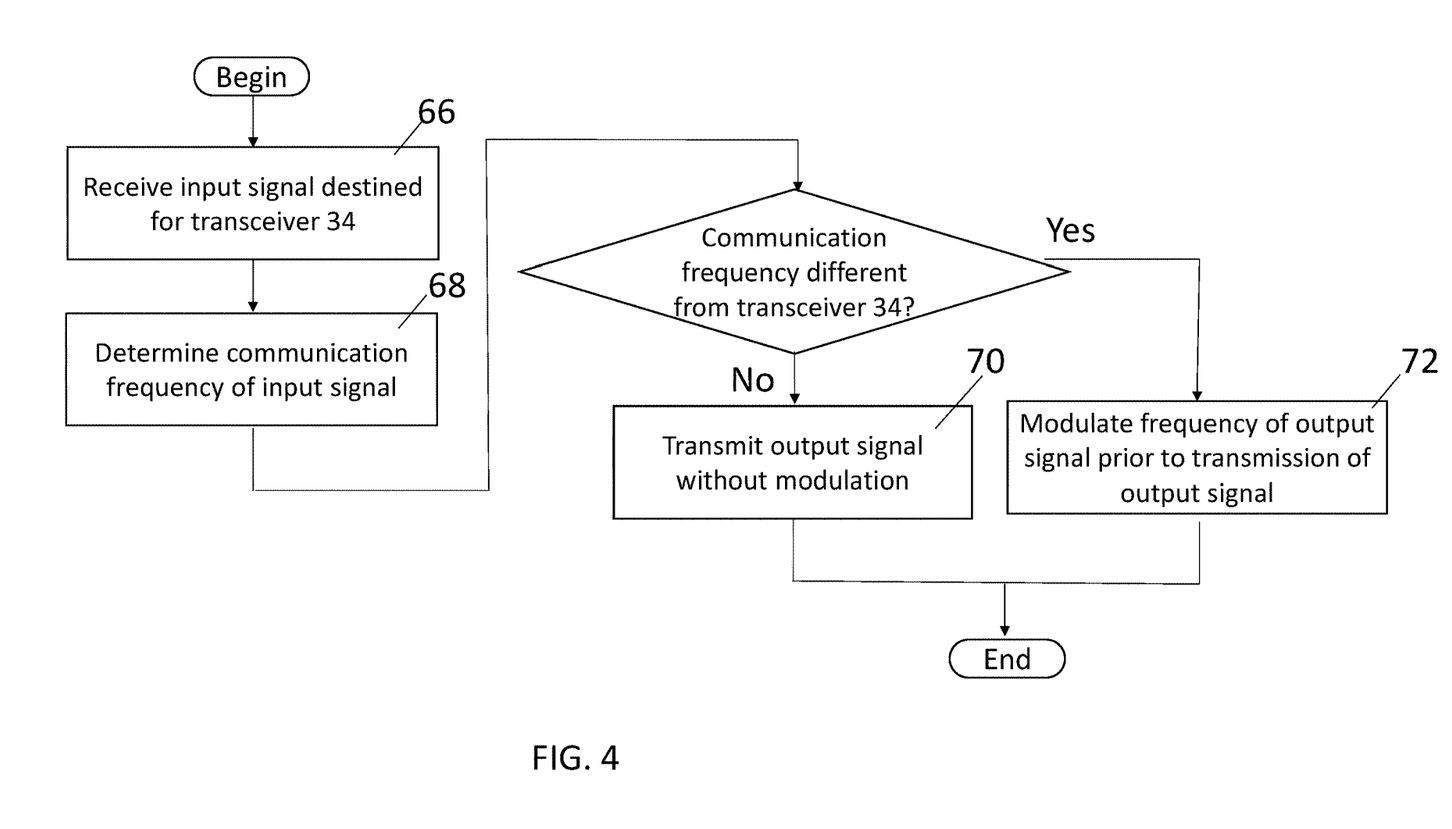

Referring now to FIGS. 3-4, one embodiment of a method for transmitting and receiving signals having varying frequencies along a power line 18 within a vehicle such as tractor-trailer 10 may include the several steps relating to transmission of signals having different frequencies (FIG. 3) and receipt of signals having different frequencies (FIG. 4). Referring to FIG. 3, for transmission of signals, the method may begin with the step 52 in which circuit 36 receives an output signal generated and transmitted by a transceiver 34 in response to a signal from controller 24 and intended for transmission to one of systems $22_1$, $22_2$. As discussed above, transceiver 34 is configured transmit output signals along power line 18 at relatively high frequency (e.g., a frequency higher than the frequencies at which signals are transmitted under the J2497 standard).

The method may continue with the step 54 in which circuit 36 determines whether the system 22₁, 22₂ to which the output signal is being transmitted is configured to receive the output signal at the same frequency as the output signal transmitted by transceiver 34 or at a different (e.g., lower) frequency than the frequency of the output signal transmitted by transceiver 34. Step 54 may include several substeps.

In sub step 56, controller 44 determines the intended destination for the output signal. Controller 44 may extract address information from the output signal in a conventional manner to determine the system 22₁, 22₂ or other destination for the output signal. In substep 58, controller 44 of circuit 36 may access a data structure correlating each of systems 22₁, 22₂ with one of a plurality of communication frequencies. The data structure may be stored in memory 46 of controller 44 or an external memory such as memory 42. The data structure may comprise a look up table or other conventional data structure. Each system 22₁, 22₂ and other potential destination for an output signal from system 20 is correlated within the data structure with a communication frequency. The data structure may indicate that the destination for the output signal is configured to receive signals at the same frequency as the output signal transmitted by transceiver 34 or at a different frequency. The data structure may indicate, for example, that system 22₂ is configured to transmit and receive signals at the same relatively high frequency used by transceiver 34, but that system 22₁ is configured to transmit and receive signals at a lower frequency such as the frequency at which signals are transmitted under the J2497 standard. In substep 60, controller 44 attempts to locate a communication frequency for the destination for output signal within the data structure based on the determined destination for the output signal in substep 56.

If the communication frequency for the destination for the output signal cannot be determined by controller 44 (e.g., if there is no entry in the data structure for the destination), controller 44 may, in step 62 generate a control signal to frequency selector circuit 40 to cause circuit 40 to modulate the frequency of the output signal to a default frequency. In accordance with one embodiment, controller 44 may direct circuit 40 to modulate the frequency of the output signal to a lower frequency corresponding to the J2497 standard. If the communication frequency for the destination for the output signal can be determined by controller 44 and the communication frequency for the destination for the output signal is the same as the communication frequency for the output signal, controller 44 may generate a control signal in step 64 to frequency selector circuit 40 directing circuit 40 to transmit the output signal without modulating the frequency of the output signal. Therefore, in the embodiment described herein, controller 44 may determine that the output signal is destined for system 22₂, determine that system 22₂ employs the same communication frequency as system 20 and cause transmission of the output signal to system 22₂ along power line 18 at that frequency. If the communication frequency for the destination for the output signal can be determined by controller 44 and the frequency for the destination for the output signal differs from the transmission frequency for the output signal, controller 44 may generate a control signal in step 62 to frequency selector circuit 40 directing circuit 40 to modulate the output signal to the frequency of the destination for the output signal. Therefore, in the embodiment described herein, controller 44 may determine that the output signal is destined for system 22₁, determine that system 22₁ employs a different communication frequency than system 20 (i.e., a lower communication frequency associated with the J2497 standard) and direct frequency selector circuit 40 to modulate the frequency of the output signal prior to transmission of the output signal to system 22₁ along power line 18.

Referring now to FIG. 4, for reception of signals, the method may begin with the step 66 in which frequency control circuit 36 receives an input signal transmitted by one of systems 22₁, 22₂ prior to receipt of the input signals by the transceiver 34. As noted above, in the described embodiment transceiver 34 is configured to receive input signals at a relatively high frequency. Therefore, transceiver 34 is not configured to receive input signals directly from systems such as system 22₁ that transmit signals at the lower frequencies associated with the J2497 standard and it important to determine the transmission frequency of the input signal. The method may continue with the step 68 of determining the communication frequency of the input signal and, in particular, whether the input signal has the same frequency as signals transmitted to and from transceiver 34 or a different frequency. Circuit 36 may determine the communication frequency of the input signal in a variety of ways. First, controller 44 may extract address information from the input signal in a conventional manner to determine the system 22₁, 22₂ or other source for the input signal and may access a data structure correlating each of systems 22₁, 22₂ with one of a plurality of communication frequencies as described hereinabove. Second, circuit 36 may include a plurality of bandpass filters each configured to pass communications at certain frequencies. Controller 44 can then determine the communication frequency of the signal based on which filter passes the input signal to controller 44.

If controller 44 determines that the communication frequency of the input signal has the same frequency as signals transmitted to and from transceiver 34 (i.e., a relatively high frequency in the described embodiment), controller 44 will generate a control signal in step 70 to frequency selector circuit 40 directing circuit 40 to transmit the input signal to transceiver 34 without modulation. Therefore, in the embodiment described herein, controller 44 may receive a signal from system 22₂, determine that the signal has the same communication frequency as used by system 20 and generate a control signal to frequency selector circuit 40 directing circuit 40 to transmit the input signal to system 20 without modulation. If controller 44 determines that the communication frequency of the input signal has a different frequency as signals transmitted to and from transceiver 34 (e.g., the lower frequency associated with the J2497 standard), controller 44 will generate a control signal in step 72 to frequency selector circuit 40 directing circuit 40 to modulate the input signal to the same frequency as signals transmitted to and from transceiver 34. Therefore, in the embodiment described herein, controller 44 may receive a signal from system 22₁, determine that the signal has a different communication frequency than the one use by system 20 and generate a control signal to frequency selector circuit 40 directing circuit 40 to modulate the signal prior to transmission of the input signal to system 20.

Figure 5:
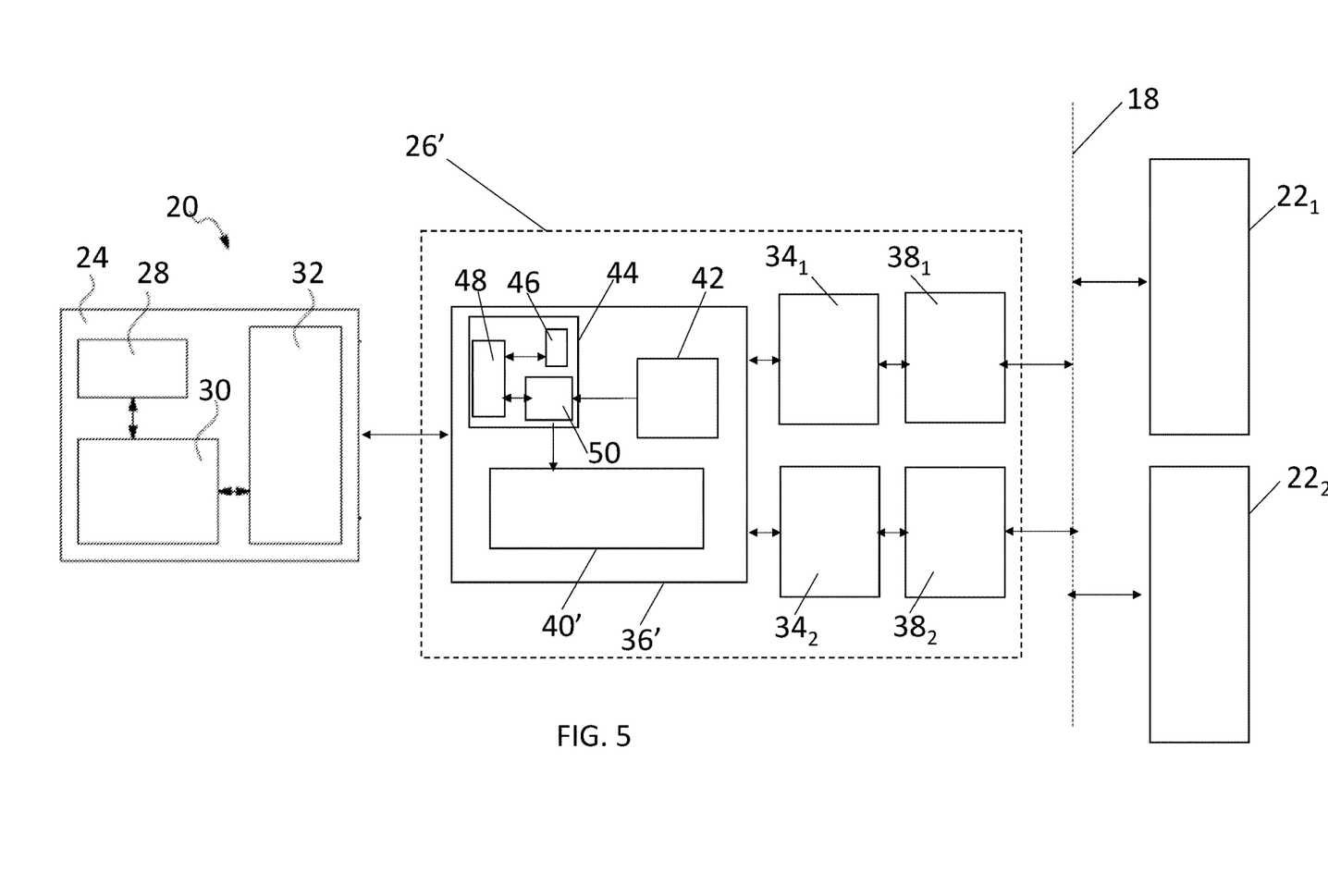
FIG. 5 is a diagrammatic view of another embodiment of a system for transmitting and receiving signals having varying frequencies along a power line in a vehicle

Referring now to FIG. 5, an alternative embodiment of a system 26' for transmitting and receiving signals having varying frequencies along a power line 18 within a vehicle 10 is shown. System 26' is similar to system 26 but, instead of using a single transceiver 34 configured to transmit and receive signals using a single frequency and modulating the frequency of output signals from, and input signals to, transceiver 34 to enable communications with systems 20, 22 using different communication frequencies, system 26' employs multiple transceivers 341, 342 and corresponding signal conditioning circuits 381, 382 configured to transmit and receive communications using different frequencies. For example, transceiver 341 may be configured to transmit and receive communications at a relatively high frequency (e.g., 2 MHz to 50 MHz) while transceiver 342 may be configured to transmit and receive signals at a lower frequency (e.g., the lower frequency associated with the J2497 standard). It should be understood that the use of two transceivers 341, 342 and associated conditioning circuits 381, 382 is exemplary only and that additional transceivers and conditioning circuits could be employed to handle communications at additional frequencies. Frequency control circuit 36' and, in particular, frequency selector circuit 40', are configured to transmit signals to, and receive signals from, each transceiver 341, 342. When transmitting output signals in response to signals from controller 24, frequency control circuit 36' may determine the communication frequency used by the system 22$_1$, 22$_2$ to which the output signal is being transmitted. Controller 44 of circuit 36 may determine the communication frequency for the destination system 22$_1$, 22$_2$ in the manner set forth hereinabove. Depending on the determined communication frequency, controller 44 may direct frequency selector circuit 40' to output the signal to either of transceivers 341, 342. When receiving input signals from one of system 22$_1$, 22$_2$, frequency control circuit 36' will receive the signal through the appropriate transceiver 341, 342.

A system 26 and method for transmitting and receiving signals having varying frequencies along a power line 18 within a vehicle 10 in accordance the present teachings represent an improvement as compared to conventional systems and methods. In particular, the system 26 and method disclosed herein enable transmission and receipt of communications at multiple frequencies along the power line 18 using a single transceiver 34. As a result, the system 26 and method facilitate high speed communications for applications requiring higher speed communications while preserving backwards compatibility with legacy systems transmitting communications at lower speeds and without requiring separate transceivers for handling communications at different speeds While the invention has been shown and described with reference to one or more particular embodiments thereof, it will be understood by those of skill in the art that various changes and modifications can be made without departing from the spirit and scope of the invention.

What is claimed is:

1. A system for transmitting and receiving signals having varying frequencies along a power line within a vehicle, comprising:
   a transceiver configured to
      receive a signal generated by a controller for a first electronic system on the vehicle and transmit an output signal along the power line to a second electronic system on the vehicle responsive to the signal received from the controller, the transceiver configured to transmit the output signal at a first frequency; and,
      receive an input signal along the power line generated by one of the second electronic system and a third electronic system on the vehicle and transmit a signal to the controller responsive to the input signal received from the one of the second electronic system and the third electronic system, the transceiver configured to receive the input signal at the first frequency; and,
   a frequency control circuit configured to
      determine whether the second electronic system is configured to receive the output signal at the first frequency or at a second frequency different than the first frequency;
      modulate the frequency of the output signal to the second frequency if the second electronic system is configured to receive the output signal at the second frequency;
      determine whether the input signal has the first frequency or a third frequency different than the first frequency; and,
      modulate the frequency of the input signal to the first frequency if the input signal has the third frequency.

2. The system of claim 1 wherein the second frequency is lower than the first frequency.

3. The system of claim 1 wherein at least one of the second frequency and the third frequency is lower than the first frequency.

4. The system of claim 1 wherein both of the second frequency and the third frequency are lower than the first frequency.

5. The system of claim 1 wherein the second frequency is equal to the third frequency.

6. The system of claim 1 wherein the frequency control circuit is further configured to modulate the frequency of the output signal to the second frequency if the frequency control circuit cannot determine whether the second electronic system is configured to receive the output signal at the first frequency.

7. The system of claim 1 wherein the frequency control circuit is further configured, in determining whether the second electronic system is configured to receive the output signal at the first frequency or the second frequency, to access a data structure correlating the second electronic system with one of a plurality of communication frequencies, the plurality of communication frequencies including the first frequency and the second frequency.

8. The system of claim 1 wherein the vehicle comprises a tractor-trailer and the first electronic system is mounted on the tractor.

9. The system of claim 8 wherein the second electronic system is mounted on the trailer.

10. A method for transmitting and receiving signals having varying frequencies along a power line within a vehicle, comprising:
   receiving an output signal transmitted by a transceiver coupled to a controller for a first electronic system on the vehicle, the transceiver configured to transmit the output signal along the power line at a first frequency to a second electronic system on the vehicle responsive to the signal generated by the controller;
   determining whether the second electronic system is configured to receive the output signal at the first frequency or at a second frequency different than the first frequency;
   modulating the frequency of the output signal to the second frequency if the second electronic system is configured to receive the output signal at the second frequency;
   receiving an input signal transmitted by one of the second electronic system and a third electronic system prior to receipt of the input signal by the transceiver, the transceiver configured to receive the input signal along the power line at the first frequency and to transmit a signal to the controller responsive to the input signal;

determining whether the input signal has the first frequency or a third frequency different than the first frequency; and, modulating the frequency of the input signal to the first frequency if the input signal has the third frequency.

11. The method of claim 10 wherein the second frequency is lower than the first frequency.

12. The method of claim 11 wherein at least one of the second frequency and the third frequency is lower than the first frequency.

13. The method of claim 11 wherein both of the second frequency and the third frequency are lower than the first frequency.

14. The method of claim 11 wherein the second frequency is equal to the third frequency.

15. The method of claim 10 further comprising modulating the frequency of the output signal to the second frequency if no determination can be made whether the second electronic system is configured to receive the output signal at the first frequency.

16. The method of claim 10 wherein determining whether the second electronic system is configured to receive the output signal at the first frequency or the second frequency includes accessing a data structure correlating the second electronic system with one of a plurality of communication frequencies, the plurality of communication frequencies including the first frequency and the second frequency.

17. The method of claim 10 wherein the vehicle comprises a tractor-trailer and the first electronic system is mounted on the tractor.

18. The method of claim 17 wherein the second electronic system is mounted on the trailer.

\* \* \* \* \*

UNITED STATES PATENT AND TRADEMARK OFFICE
CERTIFICATE OF CORRECTION

PATENT NO. : 12,057,894 B2
APPLICATION NO. : 17/884025
DATED : August 6, 2024
INVENTOR(S) : Michael D. Cremona, Thomas J. Hayes and Tandi Wijaya It is certified that error appears in the above-identified patent and that said Letters Patent is hereby corrected as shown below:

In the Claims

In Column 11, Line 8 (Claim 12), "claim 11" should read "claim 10".

In Column 11, Line 11 (Claim 13), "claim 11" should read "claim 10".

In Column 11, Line 14 (Claim 14), "claim 11" should read "claim 10".

Signed and Sealed this
Third Day of September, 2024

Katherine Kelly Vidal
*Director of the United States Patent and Trademark Office*